US009593714B1

(12) United States Patent
Ince

(10) Patent No.: US 9,593,714 B1
(45) Date of Patent: Mar. 14, 2017

(54) AXIAL BEARING CAGE

(71) Applicant: Schaeffler Technologies AG & Co. KG, Herzogenaurach (DE)

(72) Inventor: Marion Jack Ince, Mount Holly, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/884,095

(22) Filed: Oct. 15, 2015

(51) Int. Cl.
| | |
|---|---|
| *F16C 33/46* | (2006.01) |
| *F16C 19/30* | (2006.01) |
| *F16C 19/36* | (2006.01) |
| *F16C 33/54* | (2006.01) |
| *F16C 33/38* | (2006.01) |

(52) U.S. Cl.
CPC .......... *F16C 19/305* (2013.01); *F16C 33/467* (2013.01); *F16C 33/54* (2013.01); *F16C 33/543* (2013.01); *F16C 33/3887* (2013.01); *F16C 33/4682* (2013.01)

(58) Field of Classification Search
CPC .... F16C 33/3887; F16C 33/46; F16C 33/467; F16C 33/4682; F16C 33/543; F16C 33/547; F16C 19/30; F16C 19/305; F16C 19/46; F16C 19/463; Y10T 29/49691; Y10T 29/49645
USPC ....... 384/547–548, 560, 565, 580, 590, 572, 384/574, 593, 618, 623, 575; 29/898.064, 29/898.067
See application file for complete search history.

(56) References Cited

U.S. PATENT DOCUMENTS

| | | | | | |
|---|---|---|---|---|---|
| 3,226,170 | A | * | 12/1965 | Neese | F16C 19/305 384/623 |
| 3,240,542 | A | * | 3/1966 | Jahn | F16C 19/305 384/623 |
| 3,314,738 | A | * | 4/1967 | Schaeffler | F16C 19/305 384/578 |

(Continued)

FOREIGN PATENT DOCUMENTS

| | | | |
|---|---|---|---|
| JP | 2002070872 A | * | 3/2002 |
| JP | 2003322158 A | * | 11/2003 |

(Continued)

OTHER PUBLICATIONS

Product overview—Cage and Roller Assembly. Schaeffler Catalog HR1, Jun. 2006.

*Primary Examiner* — Marcus Charles
(74) *Attorney, Agent, or Firm* — Volpe and Koenig, P.C.

(57) ABSTRACT

A cage is provided with guidance and retention elements for the cylindrical rolling elements. The cage includes a radially inner rim including a first flange, and a plurality of first retention tabs extend from the first flange that include first and second lateral surfaces. A radially outer rim includes a second flange, and a plurality of second retention tabs extend from the second flange that include third and fourth lateral surfaces. The first and second lateral surfaces of the first retention tabs and the third and fourth lateral surfaces of the second retention tabs face each of the pockets to define lower rolling element retention elements. Webs include first and second rolling element facing guide surfaces that face adjacent ones of the pockets. Upper rolling element retention elements of the webs are provided on an opposite side of a centerline from the lower rolling element retention elements.

11 Claims, 4 Drawing Sheets

(56) References Cited

U.S. PATENT DOCUMENTS

| | | | | |
|---|---|---|---|---|
| 3,442,562 A * | 5/1969 | Teufel | F16C 19/46 | 384/575 |
| 3,785,710 A * | 1/1974 | Alling | F16C 19/305 | 384/623 |
| 6,367,983 B1 * | 4/2002 | Muntnich | F16C 19/44 | 29/898.067 |
| 7,210,854 B2 * | 5/2007 | Ince | F16C 33/546 | 384/572 |
| 7,273,318 B2 * | 9/2007 | Hayashi | C21D 9/36 | 384/619 |
| 7,637,670 B2 * | 12/2009 | Oishi | F16C 19/30 | 384/623 |
| 7,837,394 B2 * | 11/2010 | Takamizawa | F16C 33/4635 | 384/572 |
| 8,448,430 B2 * | 5/2013 | Fukami | F16C 19/30 | 384/621 |
| 8,480,309 B2 * | 7/2013 | Ince | F16C 33/541 | 384/575 |
| 8,926,191 B2 * | 1/2015 | Fugel | F16C 19/30 | 384/623 |
| 2004/0091193 A1 * | 5/2004 | Obayashi | F16C 33/48 | 384/623 |
| 2009/0041402 A1 * | 2/2009 | Shattuck | F16C 19/30 | 384/623 |
| 2010/0278471 A1 * | 11/2010 | Oishi | B21D 53/12 | 384/572 |
| 2011/0229067 A1 * | 9/2011 | Brown | F16C 19/26 | 384/572 |
| 2015/0330448 A1 * | 11/2015 | Brown | F16C 33/547 | 384/623 |

FOREIGN PATENT DOCUMENTS

| | | | | |
|---|---|---|---|---|
| JP | 4320599 B2 * | 8/2009 | | F16C 19/463 |
| JP | 2011231831 A * | 11/2011 | | |

* cited by examiner

AXIAL BEARING CAGE

FIELD OF INVENTION

The present invention relates to a bearing assembly, and is more particularly related to a cage for an axial bearing assembly.

BACKGROUND

Bearing assemblies are used in a variety of applications. One type of known bearing assembly is an axial bearing, which includes cylindrical rolling elements with a cage to guide the cylindrical rolling elements as they roll between an inner bearing ring and an outer bearing ring. Known cages for axial bearing assemblies provide varying guidance and retention features. When these guidance features fail to provide adequate guidance to the rolling elements, the rolling elements skew or pivot causing friction and lowering the efficiency of the bearing assembly. Some of the known cages include webs extending between a radially inner ring and a radially outer ring of the cage. Depending upon the stresses experienced at the connection area between the webs and rings these webs can fracture resulting in failure of the bearing assembly.

It would be desirable to provide a cage with improved rolling element guidance and retention elements that further reduce skewing of the cylindrical rolling elements within the pockets of the bearing cage, and provide increased strength at the connection area between the webs and the rings.

SUMMARY

A cage for a bearing assembly is provided with improved guidance and retention elements for the cylindrical rolling elements. The cage includes a radially inner rim including a first flange, and a plurality of first retention tabs extend from the first flange that include first and second lateral surfaces. A radially outer rim includes a second flange, and a plurality of second retention tabs extend from the second flange that include third and fourth lateral surfaces. A plurality of webs extend between the radially inner rim and the radially outer rim to define a plurality of pockets adapted to receive the rolling elements. The first and second lateral surfaces of the first retention tabs and the third and fourth lateral surfaces of the second retention tabs face each of the pockets to define lower rolling element retention elements. Each of the plurality of webs have first and second rolling element facing guide surfaces that face adjacent ones of the pockets. Upper rolling element retention elements of the webs are provided on an opposite side of a centerline from the lower rolling element retention elements.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
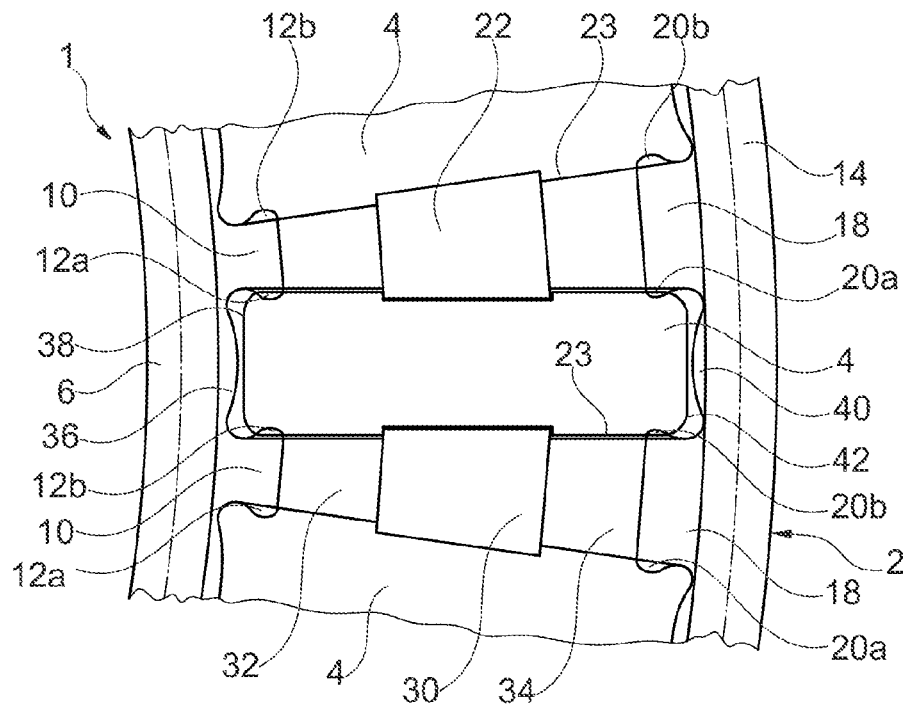
FIG. 1 shows a top view of a portion of an axial bearing assembly according to the invention.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
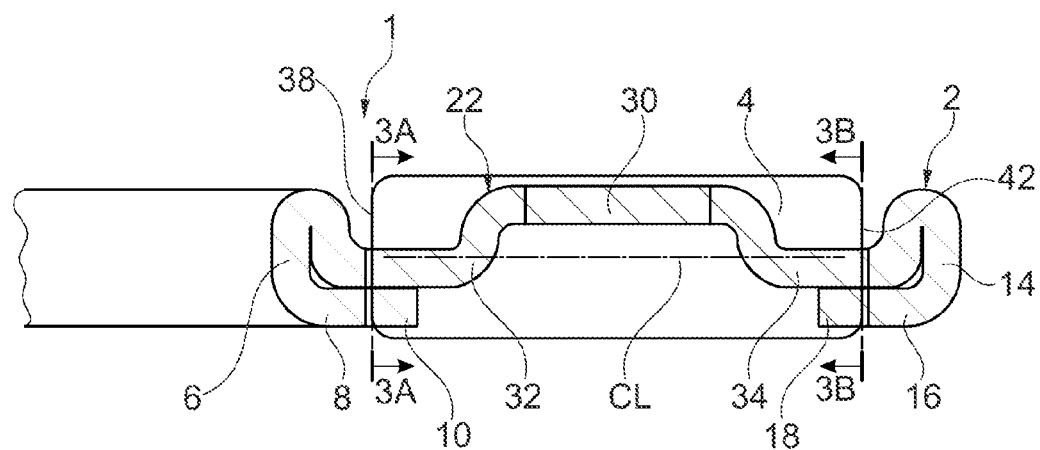
FIG. 2 shows a cross sectional view in a circumferential direction of the axial bearing assembly of FIG. 1.

As shown in FIGS. 1-3B, a cage 2 with improved retention and guidance features is provided. The cage 2 has a generally annular shape, only a portion of which is shown in FIG. 1, and is provided for an axial bearing assembly 1 including cylindrical rolling elements 4. As shown in FIGS. 1 and 2, the cage 2 includes a radially inner rim 6 including a first flange 8, and a plurality of first retention tabs 10 extend from the first flange 8 and include first and second lateral surfaces 12a, 12b facing adjacent ones of the pockets 23. As shown in FIGS. 1 and 2, the cage 2 includes a radially outer rim 14 including a second flange 16, and a plurality of second retention tabs 18 extend from the second flange 16 and include third and fourth lateral surfaces 20a, 20b that face adjacent ones of the pockets 23. The cage 2 includes a plurality of webs 22 that extend between the radially inner rim 6 and the radially outer rim 14 to define the plurality of pockets 23 that are adapted to receive the cylindrical rolling elements 4.

Figure 3A:
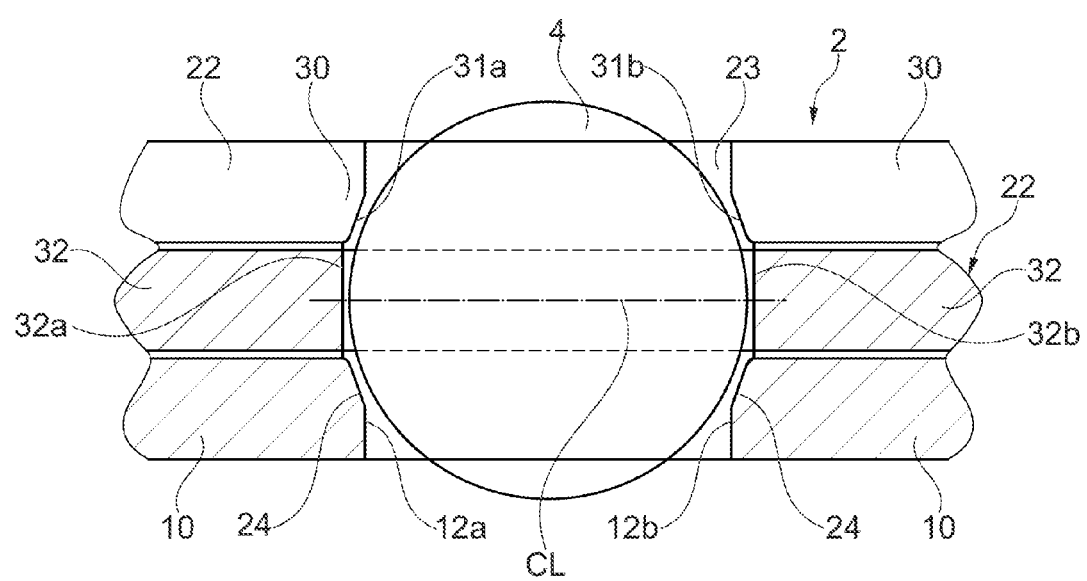
FIG. 3A shows a cross-sectional view along the line 3A-3A in FIG. 2.
Figure 3B:
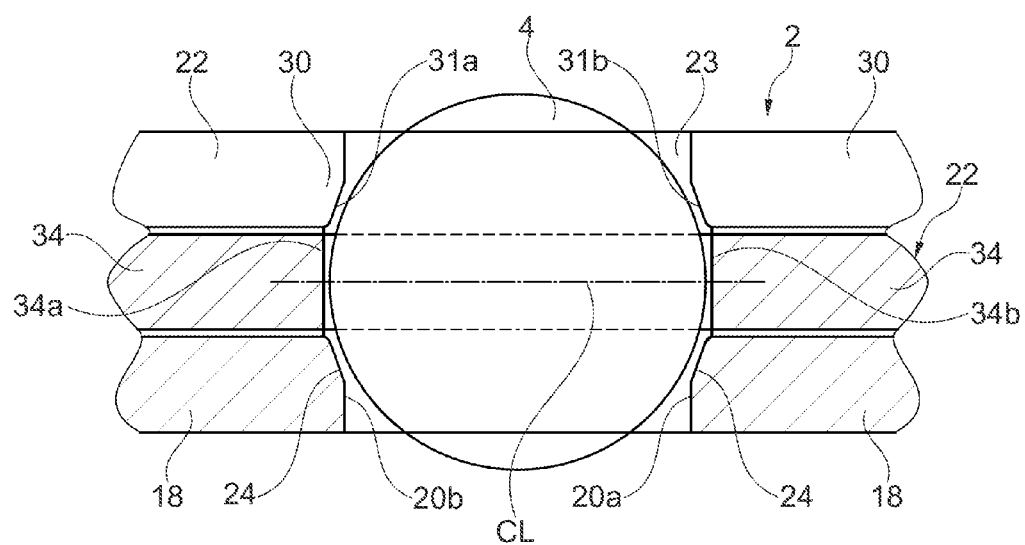
FIG. 3B shows a cross-sectional view along the line 3B-3B in FIG. 2.

The first and second lateral surfaces 12a, 12b of adjacent ones of the first retention tabs 10 and the third and fourth lateral surfaces 20a, 20b of adjacent ones of the second retention tabs 18 face each of the pockets 23 to define lower rolling element retention elements 24. As shown in FIGS. 3A and 3B, each of the plurality of webs 22 includes guides defined by first and second rolling element facing guide surfaces 32a, 32b, 34a, 34b that face adjacent ones of the pockets 23. Upper rolling element retention elements 30 are located on the webs 22 on an opposite side of a centerline CL from the lower rolling element retention elements 24. First and second upper rolling element retention lateral surfaces 31a, 31b that face adjacent areas of the pockets 23 are provided on the upper rolling element retention elements 30.

The guide surfaces 32a, 32b, 34a, 34b extend in a radial direction generally along the centerline CL which corresponds to a centerline of each of the cylindrical rolling elements 4. The guide surfaces 32a, 32b, 34a, 34b are preferably located on a radially inner web portion 32 and a radially outer web portion 34. As shown in FIG. 2, the upper rolling element retention element 30 extends between and is axially offset from the radially inner web portion 32 and the radially outer web portion 34.

As shown in FIG. 1, the radially inner rim 6 includes a first plurality of projections 36 that extend toward the pockets 23, and each of the first plurality of projections 36 is arranged between adjacent ones of the first plurality of retention tabs 10 for supporting a first axial end 38 of the cylindrical rolling elements 4. As shown in FIG. 1, the radially outer rim 14 includes a second plurality of projections 40 that extend toward the pockets 23, and each of the second plurality of projections 40 is arranged between adjacent ones of the second plurality of retention tabs 18 for supporting a second axial end 42 of the cylindrical rolling elements 4. These projections 36, 40 have a rounded profile and provide support to the axial ends 38, 42 of the rolling elements 4 generally along the centerline CL of the cylindrical rolling elements 4.

As shown in FIG. 1, the projections 36, 40 preferably have a radiused surface. One of ordinary skill in the art would recognize that other arrangements and shapes of the projections 36, 40 can be used. As shown in FIG. 1, the cylindrical rolling elements 4 are supported by the pockets 23 away from the connection areas of the webs 22 with the respective radially inner rim 6 and radially outer rim 14. This configuration reduces the stresses experienced at these connection areas and helps to reduce the possibility of fracturing at these connection areas.

As shown in FIG. 2, the first flange 8 is bent approximately 180° such that the first plurality of retention tabs 10 extend under the web portions 32 with the guide surfaces 32a, 32b, and the second flange 16 is bent approximately 180° such that the second plurality of retention tabs 18 extend under the web portions 34 with the guide surfaces 34a, 34b. One of ordinary skill in the art recognizes that this configuration can varied to change the axial height of the cage 2.

As shown in FIGS. 3A and 3B, the first and second rolling element facing guide surfaces 32a, 32b, 34a, 34b preferably have a flat surface facing the rolling element pockets 23. One of ordinary skill in the art recognizes the profile of the first and second rolling element facing guide surfaces 32a, 32b, 34a, 34b can be varied. The first and second outer rolling element retention lateral surfaces 31a, 31b are shown including a flat surface and a tapered end in a region closest to the centerline CL of the rolling elements 4. The first and second lateral surfaces 12a, 12b of the first retention tabs 10 and the third and fourth lateral surfaces 20a, 20b of the second retention tabs 18 preferably also include a flat surface with a tapered end in a region closest to the centerline CL of the rolling elements 4. One of ordinary skill in the art will recognize from the present disclosure that the profiles of these surfaces 12a, 12b, 20a, 20b, 31a, 31b, 32a, 32b, 34a, 34b can be varied, for example to include curved profiles to accommodate the lateral surfaces of the rolling elements 4.

Figure 4:
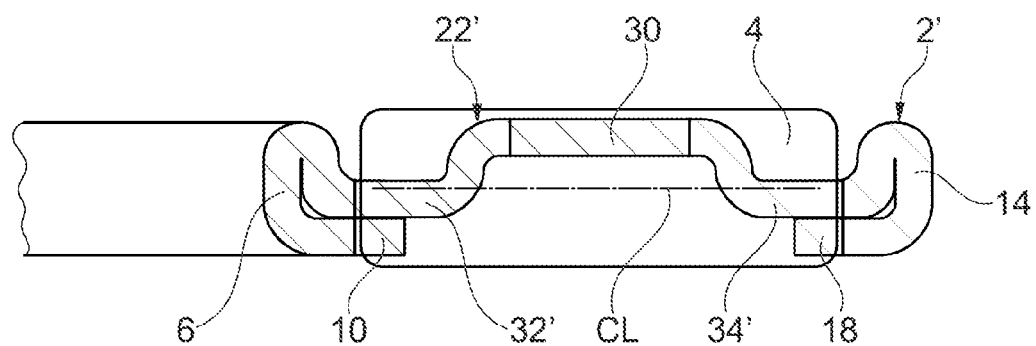
FIG. 4 shows a second embodiment of an axial bearing assembly according to the invention.

In a second embodiment of the cage 2' shown in FIG. 4, the web 22' has a different configuration than the web 22 of the first embodiment. As shown in FIG. 4, a radially inner guide 32' is provided lower than the radially inner guide 32 of the first embodiment with respect to the centerline of the rolling elements 4, and the radially outer guide 34' is provided lower than the radially outer guide 34 of the first embodiment with respect to the centerline of the rolling elements 4. The webs 22' of the second embodiment are still arranged generally along a centerline of the rolling elements 4. One of ordinary skill in the art recognizes that the cage can include different configurations of the webs 22, 22', such as a guide above the centerline of the cylindrical rolling elements 4.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A cage for an axial bearing assembly including rolling elements, the cage comprising:
    a radially inner rim including a first flange, a plurality of first retention tabs extend from a free end of the first flange and include first and second lateral surfaces;
    a radially outer rim including a second flange, a plurality of second retention tabs extend from a free end of the second flange and include third and fourth lateral surfaces;
    a plurality of webs extending between the radially inner rim and the radially outer rim to define a plurality of pockets adapted to receive the rolling elements, the first and second lateral surfaces of the first retention tabs and the third and fourth lateral surfaces of the second retention tabs that face each of the pockets define lower rolling element retention elements, each of the plurality of webs having first and second rolling element facing guide surfaces that face adjacent ones of the pockets; and
    upper rolling element retention elements on each of the plurality of webs on an opposite side of a centerline from the lower rolling element retention elements.

2. The cage of claim 1, wherein the guide surfaces extend in a radial direction along the centerline which corresponds to a centerline of the rolling element.

3. The cage of claim 1, wherein the radially inner rim includes a first plurality of projections that extend toward the pockets, each of the projections arranged between adjacent ones of the first plurality of retention tabs for supporting a first axial end of the cylindrical rolling elements.

4. The cage of claim 1, wherein the radially outer rim includes a second plurality of projections that extend toward the pockets, each of the projections is arranged between adjacent ones of the second plurality of retention tabs for supporting a second axial end of the cylindrical rolling elements.

5. The cage of claim 1, wherein the first flange is bent approximately 180° such that the first retention tabs extend under the radially inner web portions, and the second flange is bent approximately 180° such that the second retention tabs extend under the radially outer web portions.

6. A cage for an axial bearing assembly including rolling elements, the cage comprising:
    a radially inner rim including a first flange, a plurality of first retention tabs extend from the first flange and include first and second lateral surfaces;
    a radially outer rim including a second flange, a plurality of second retention tabs extend from the second flange and include third and fourth lateral surfaces;
    a plurality of webs extending between the radially inner rim and the radially outer rim to define a plurality of pockets adapted to receive the rolling elements, the first and second lateral surfaces of the first retention tabs and the third and fourth lateral surfaces of the second retention tabs that face each of the pockets define lower rolling element retention elements, each of the plurality of webs having first and second rolling element facing guide surfaces that face adjacent ones of the pockets; and upper rolling element retention elements on each of the plurality of webs on an opposite side of a centerline from the lower rolling element retention elements, wherein the guide surfaces include radially inner guide surfaces extending from a radially inner web portion and radially outer guide surfaces extending from a radially outer web portion, and the rolling element retention elements extend between and are axially offset from the radially inner web portions and the radially outer web portions.

7. A roller-cage assembly comprising:

a plurality of cylindrical rolling elements; and a cage including a radially inner rim including a first flange, a plurality of first retention tabs extend from the first flange and include first and second lateral surfaces, a radially outer rim including a second flange, a plurality of second retention tabs extend from the second flange and include third and fourth lateral surfaces, and a plurality of webs extending between the radially inner rim and the radially outer rim to define a plurality of pockets adapted to receive the rolling elements, the first and second lateral surfaces of the first retention tabs and the third and fourth lateral surfaces of the second retention tabs that face each of the pockets define lower rolling element retention elements, each of the plurality of webs having first and second rolling element facing guide surfaces that face adjacent ones of the pockets, and upper rolling element retention elements on each of the plurality of webs on an opposite side of a centerline from the lower rolling element retention elements, wherein the guide surfaces include radially inner guide surfaces extending from a radially inner web portion and radially outer guide surfaces extending from a radially outer web portion, and the rolling element retention elements extend between and are axially offset from the radially inner web portions and the radially outer web portions.

8. The roller-cage assembly of claim 7, wherein the guide surfaces extends in a radial direction along the centerline which corresponds to a centerline of a respective rolling element of the plurality of cylindrical rolling elements.

9. The roller-cage of claim 7, wherein the radially inner rim includes a first plurality of projections that extend toward the pockets, each of the projections arranged between adjacent ones of the first plurality of retention tabs for supporting a first axial end of the cylindrical rolling elements.

10. The roller-cage of claim 7, wherein the radially outer rim includes a second plurality of projections that extend toward the pockets, each of the projections is arranged between adjacent ones of the second plurality of retention tabs for supporting a second axial end of the cylindrical rolling elements.

11. The roller-cage of claim 7, wherein the first flange is bent approximately 180° such that the first retention tabs extend under the radially inner web portions, and the second flange is bent approximately 180° such that the second retention tabs extend under the radially outer web portions.

* * * * *